(No Model.)

T. E. FRIKE.
WIRE STRETCHER AND STAPLE PULLER.

No. 418,172. Patented Dec. 31, 1889.

Witnesses
Thomas Durant
Alex J. Stewart

Inventor
Thomas E. Frike.
By his Attorneys
Church & Church

N. PETERS, Photo-Lithographer, Washington, D. C.

UNITED STATES PATENT OFFICE.

THOMAS E. FRIKE, OF COATSBURG, ILLINOIS.

WIRE-STRETCHER AND STAPLE-PULLER.

SPECIFICATION forming part of Letters Patent No. 418,172, dated December 31, 1889.

Application filed September 3, 1889. Serial No. 322,879. (No model.)

*To all whom it may concern:*

Be it known that I, THOMAS E. FRIKE, of Coatsburg, in the county of Adams and State of Illinois, have invented certain new and useful Improvements in Wire-Stretchers and Staple-Pullers; and I do hereby declare the following to be a full, clear, and exact description of the same, reference being had to the accompanying drawings, forming a part of this specification, and to the letters of reference marked thereon.

This invention relates to certain improvements in implements for stretching or straining the wires of a fence or similar structure, and has for its object to provide an implement by means of which the wire may be quickly and easily put under tension and retained in such position while the operator proceeds to staple it permanently in place.

To these ends the invention consists in certain novel details of construction and combinations and arrangements of parts, to be hereinafter described, and pointed out particularly in the claims at the end of this specification.

Figure 1:
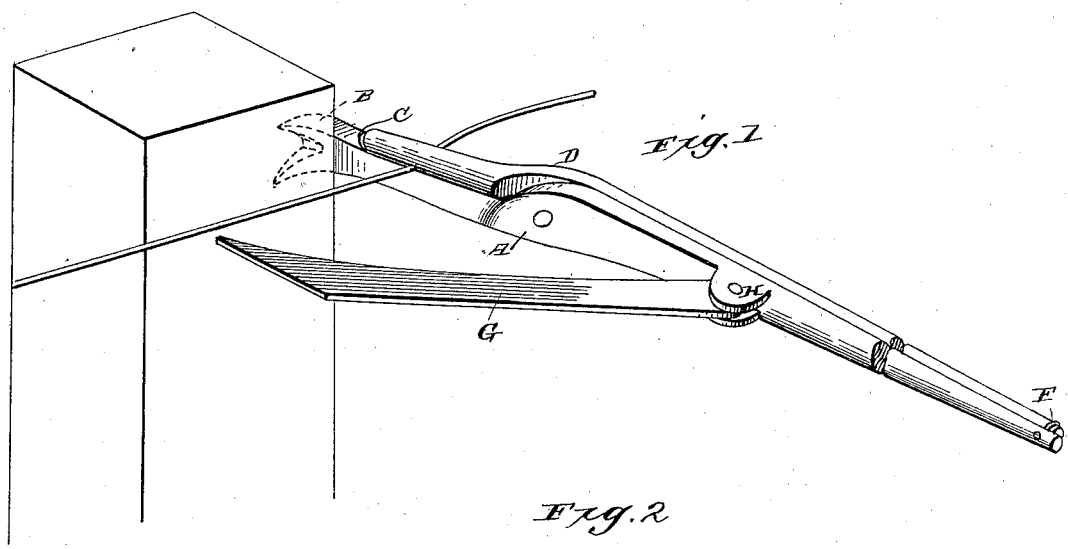
Figure 2:
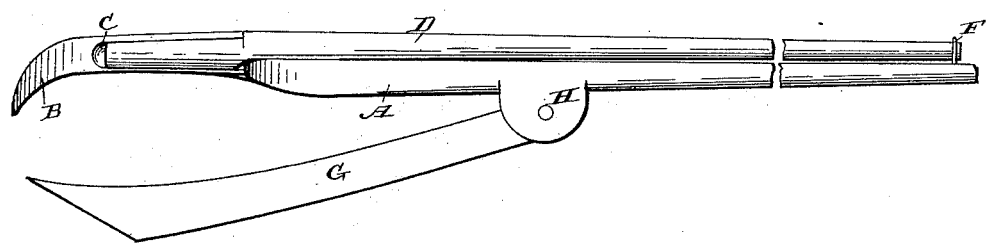
Figure 3:
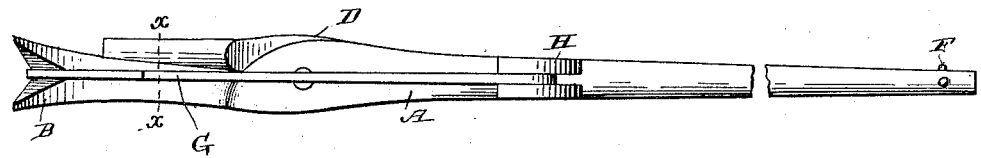
Figure 4:
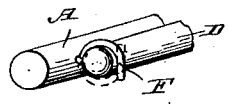
Figure 5:
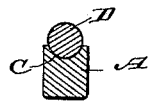

Referring to the accompanying drawings, Figure 1 is a perspective view of an implement constructed in accordance with my invention, showing the method of operation. Fig. 2 is a plan view of the implement. Fig. 3 is an elevation. Fig. 4 is a detail of the end of the handle. Fig. 5 is a section on the line $x$ $x$, Fig. 3.

Like letters of reference refer to the same parts.

The main portion or body of the implement consists of a bar A, having the separated claws B at one end, with the concavity C adjacent thereto. Beyond the concavity the bar is flattened and provision made for the attachment of the pivoted jaw D, the shorter end of which is substantially cylindrical and fits within the concavity before referred to, constituting in connection therewith the gripping-jaws for the wire. The longer arm of the jaw D extends out to the handle end of the bar, and when the implement is in use is grasped with the bar and gives additional strength thereto, to say nothing of the powerful grip on the wire which may be obtained by employing such relatively long handles.

A locking device—such, for instance, as the hook F, pivoted in the end of the bar and adapted to swing around the end of the jaw D—is employed to keep the jaws closed when gripping the wire, as will be readily understood.

At an intermediate point on the bar is located a substantially-straight arm G, preferably held in pivoted bearings formed between the lugs H H on the bar. This arm extends to about the end of the bar, swinging in between the claw-points, and has its end sharpened, preferably to a chisel-point, so as to engage and hold in a wood post, and at the same time afford a strong bearing without danger of cutting in deeply or of slipping.

The operation will be readily understood, and is as follows: The wire having been extended and attached firmly to a post at one end of its length, it is gripped between the jaws of the implement at or near the opposite end and at a point slightly in advance of the end post. The claw end of the implement is then rested against the end post and the handle end swung around until the desired tension is imparted to the wire, the arm G being then swung in against the face of the post or allowed to travel along said face as the implement is swung around, effectually preventing any return movement or movement in a direction to relieve the tension of the wire. The arm G, it will be seen, acts as a pawl and serves to retain the implement at any desired point of adjustment, and by locking the gripping-jaws the wire will be held firmly under tension without the operator's presence, permitting him to staple the wire to the intermediate posts, thus enabling one man to put up the fence. It will be observed that the end of the bar which rests against the post affords a wide bearing, which prevents the accidental vertical movement of the implement, such bearing being preferably formed by the sharpened and widely-separated claw-points before referred to; and it will be further seen that when desired said claw portion may be used to extract staples or nails in the well-understood manner.

Having thus described my invention, what I claim as new is—

1. In a wire-stretcher, the combination, with the substantially-straight stretcher-bar and the pivoted wire-gripping jaw, of the substantially-straight arm pivoted to said bar at a point between its ends and having the sharpened end for engaging the post, substantially as described.

2. In a wire-stretcher, the combination, with the bar having the jaw pivoted thereto with the extended handle and catch for holding the gripping-jaws together, of the substantially-straight arm pivotally connected to said bar with the sharpened end for engaging the post, substantially as described.

3. In a wire-stretcher, the combination, with the substantially-straight stretcher-bar having the wide bearing engaging the post, whereby turning is prevented, and the wire-gripping jaw, of the substantially-straight arm pivoted to said bar and swinging in a plane at right angles to the wide bearing, substantially as described.

4. In a wire-stretcher, the combination, with the bar having the separated claw bearing at the end for engaging the post and the pivoted jaw for gripping the wire having the extended end and the lock therefor, of the substantially-straight arm pivoted to the bar with the sharpened end for engaging the post, substantially as described.

THOMAS E. FRIKE.

Witnesses:
  ALBERT W. WELLS,
  L. E. EMMONS, Jr.